April 17, 1945. C. W. BREED ET AL Re. 22,630

RAILWAY FROG BODY

Original Filed July 27, 1942 2 Sheets-Sheet 1

INVENTORS
CHARLES W. BREED
GEORGE R. BURKHARDT
BY
D. P. Wolhaupter
ATTY.

April 17, 1945. C. W. BREED ET AL Re. 22,630

RAILWAY FROG BODY

Original Filed July 27, 1942 2 Sheets-Sheet 2

INVENTORS
CHARLES W. BREED
GEORGE R. BURKHARDT
BY
D. P. Wolhaupter
ATTY.

Reissued Apr. 17, 1945

Re. 22,630

UNITED STATES PATENT OFFICE 22,630

RAILWAY FROG BODY

Charles W. Breed, Western Springs, and George R. Burkhardt, Chicago, Ill., assignors to American Brake Shoe Company, New York, N. Y., a corporation of Delaware Original No. 2,335,994, dated December 7, 1943, Serial No. 452,478, July 27, 1942. Application for reissue December 2, 1944, Serial No. 566,332

9 Claims. (Cl. 246—470)

Figure 1:
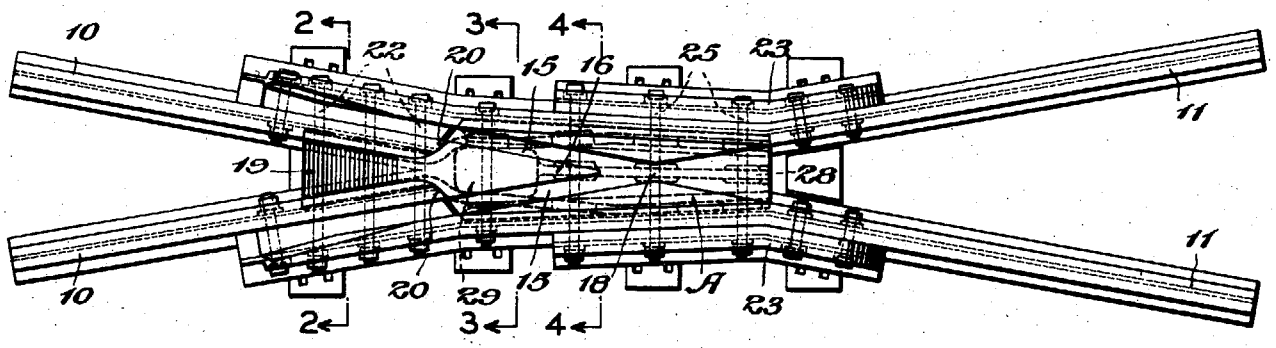

This invention relates to cast or forged bodies of railway track frogs, of either the type in which the body comprises the frog point and wing rail elements cast or forged in one piece, or the type in which the body is in the form of an insert to which the rails, separate therefrom, are joined, and the object of the invention, generally speaking, is to provide a cast or forged frog body which is exceptionally strong with respect to supporting wheel loads, and exceptionally durable in service, being very unlikely to become cracked or broken by wheel loads and shocks to which it is subjected in service.

To the end of providing a frog body which, as stated, is exceptionally strong with respect to supporting wheel loads, a special and important object of the invention is to construct said body of box-girder form, while providing a body which is very unlikely to become cracked or broken by wheel loads or shocks imposed upon the same in service. A further and important object of the invention is to provide only longitudinally extending vertical members or webs, to the exclusion of transversely extending vertical members or webs, between the top and the bottom chord members of the box-girder structure, thereby to avoid in manufacture cracks or weaknesses which would be likely to occur due to the slower cooling of the greater masses of metal at the junctions of the longitudinal and transverse vertical members than in said members, if transversely extending vertical members in addition to longitudinally extending vertical members were used.

Further to the end of providing a frog body which is exceptionally strong and unlikely to become cracked or broken in service, a special and important object of the invention is not only to construct said body of box-girder form, devoid of transversely extending vertical members between the top and the bottom chord members thereof and including only longitudinally extending vertical members between the said top and bottom chord members thereof, but to dispose said longitudinally extending members substantially beneath the traffic bearing portions of the top chord member so as most effectively to reinforce and stiffen said traffic bearing portions. In this connection and with particular reference to a frog body of the insert type, another special and important object of the invention is to construct the frog body so that the lower chord thereof rests at its sides upon the base flanges of the wing rails, whereby traffic loads imposed on the frog body are transmitted to the bases of the wing rails.

According to the invention the frog body may, as aforesaid, be cast in one piece, or it may be composed of separate top and bottom chord members which may remain separate from each other or which may be welded together to form a unitary structure. In any event, another special and important object of the invention is to form said body with suitably located openings to enable either casting of the same in one piece or convenient welding together of the top and the bottom chord members thereof if these members are formed separately from each other.

With the foregoing and other objects in view, which will become more fully apparent as the nature of the invention is better understood, the same consists in a frog body, or, in case the frog body is of the insert type, in a composite frog structure, embodying the novel features of construction, combination and arrangement of parts as will be hereinafter more fully described, illustrated in the accompanying drawings and defined in the appended claims.

In the accompanying drawings, wherein like characters of reference denote corresponding parts in related views:

Figure 1 is a top plan view of a composite frog structure wherein both the frog structure considered as a whole and the frog body in the form of an insert embody the features of the invention.

Figure 3:
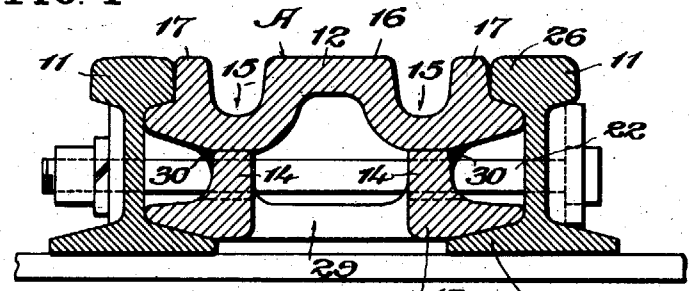
Figure 4:
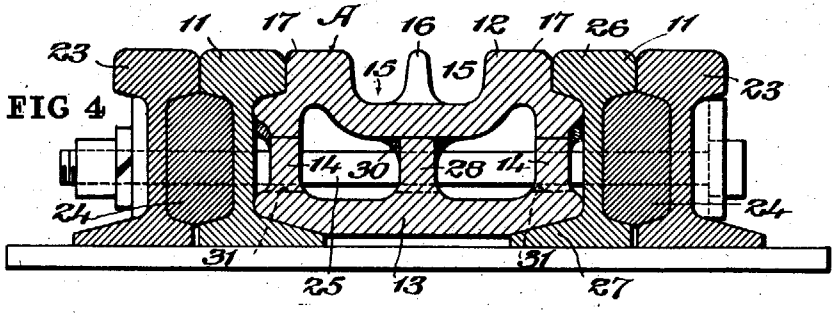
Figure 2:
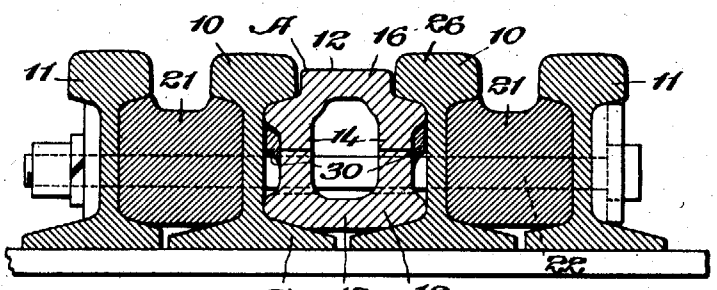

Figures 2, 3 and 4 are transverse sections on the lines 2—2, 3—3 and 4—4, respectively, of Fig. 1.

Figure 5:
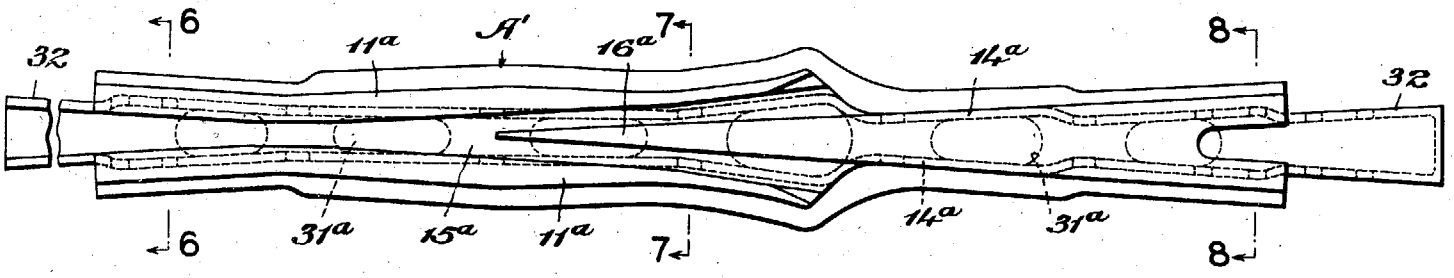
Figure 8:
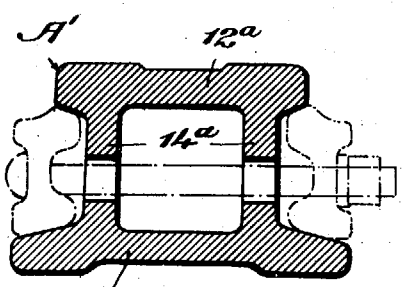
Figure 7:
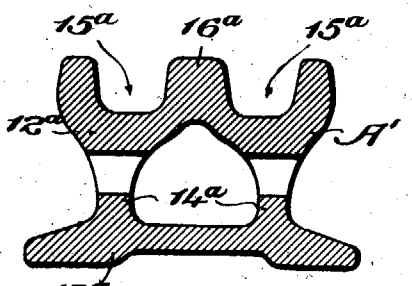
Figure 6:
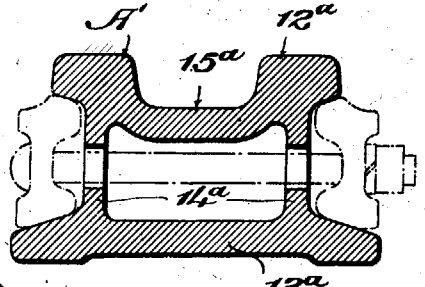

Figure 5 is a top plan view of a frog body of the type in which the frog point and wing rail elements are of one-piece construction, and which embodies features of the invention; and Figures 6, 7 and 8 are transverse sections on the lines 6—6, 7—7 and 8—8, respectively, of Fig. 5.

Referring to the drawings in detail, first with particular reference to the embodiment of the invention illustrated in Figs. 1 to 4, A designates, generally, a frog body of the insert type and of the present improved box-girder form, and 10, 10 and 11, 11 designate pairs of wing rails bolted to said frog body and extending from opposite ends thereof, respectively.

In accordance with the invention the frog body A of box-girder form comprises a top chord member, designated as 12, a bottom chord member, designated as 13, and solely longitudinally extending vertical members 14, to the exclusion of transversely extending vertical members, between said top and said bottom chord members.

The top chord member 12 is provided with wheel - flange - accommodating depressions, or channels 15 forming the frog point 16 and the wheel-engaging portions 17 to either side of said frog point, and, as shown, said portions 17 extend, as usual, in converging relationship to each other to a point 18 in advance of the sharp end of the frog point 16 and then in diverging relationship to each other to the end of the frog body remote from said frog point 16.

Generally speaking, the frog body A is of blunted-point, arrow-head shape as viewed in plan and includes, at the end thereof toward which the frog point 16 diverges, a shank 19 which tapers inwardly to relatively outwardly extending shoulders 20 at the junction of its narrower, inner end with the main portion of said body A.

The inner end portions of the wing rails 10, 10 are disposed against the outer sides of the shank 19 and at their inner ends abut the shoulders 20. On the other hand, the inner end portions of the wing rails 11, 11 are disposed against the outer sides of the main portion of the frog body A and have terminal portions which extend into overlapping relationship to the inner end portions of the wing rails 10, 10, respectively.

Between the webs of the overlapping inner end portions of the wing rails 10 and 11 at each side of the frog is interposed a filler block 21, while extending through the said overlapping inner end portions of said wing rails, and through said filler blocks 21, and through the shank 19 of the frog body A, are tie bolts 22 by means of which the inner end portions of the wing rails 10, 10 are clamped against the outer sides of said shank 19 and the relatively overlapping or terminal portions of the wing rails 11, 11 are clamped against the interposed blocks 21, thereby providing a rigid, composite, rail and frog body structure at the related end of the frog.

At the outer sides of the inner end portions of the wing rails 11, 11 are short rail sections 23, 23 and between the webs of these rail sections and the webs of the said inner end portions of the wing rails 11, 11 are interposed filler blocks 24, while extending through said short rail sections 23, and through the filler blocks 24 and through the inner end portions of the wing rails 11, 11 and through the frog body A, are tie bolts 25 by means of which the inner end portions of the wing rails 11, 11 are clamped securely against the outer sides of said frog body, thereby forming a rigid, composite, rail and frog body structure at this related end of the frog.

In accordance with usual practice and as is, of course, understood, the tops of the wing rails 10 and 11 are flush, or substantially flush, with the top of the frog point 16 and the tops of the wheel engaging portions 17, respectively, of the frog body A and the wheel flange engaging or gage sides of the heads of said wing rails are flush, or substantially flush, with the related sides of the frog point 16 and the wheel engaging portions 17, respectively, whereby said frog point 16 and said wheel engaging portions 17 form, in effect, continuations of the wing rails 10 and 11.

The shank 19 of the strong box-girder frog body A is formed at its sides to fit in the fishing spaces at the outer sides of the wing rails 10, and the main portion of said frog body is formed at its sides to fit into the fishing spaces at the inner or gage sides of the wing rails 11, between the heads 26 and the bases 27 of said wing rails, respectively, and in accordance with the invention the solely longitudinally extending, to the exclusion of transversely extending, vertical side members 14 of said box-girder frog body follow the general shape of said body as viewed in plan, being disposed, generally speaking, parallel to each other. The end portions of said vertical members 14 which are coextensive in length with the shank 19 in part underlie the heads of the wing rails 10, 10 as shown in Figs. 1 and 2, and the other end portions of said vertical members which are coextensive in length with the main portion of the frog body A in part underlie the heads of the wing rails 11, 11 as shown in Figs. 1 and 4 and in part underlie the depressions 15 of the top chord member 12 at opposite sides of the frog point 16 as shown in Figs. 1 and 3. In addition, a central, longitudinally extending vertical member 28 between the top and the bottom chord members 12 and 13 underlies the depressed or channeled portion 15 of the top chord member 12 beyond the point or tip of the frog point 16 and extends a sufficient distance beneath said point or tip to firmly support same. Thus, loads imposed on the wheel engaging portions of the top chord member 12 of the frog body are transmitted through the vertical members 14 and 28 to the lower chord member 13 and through the latter member to the bases of the wing rails, the vertical members 14 serving effectively to sustain the wheel contacting portions 17 of the top chord member 12 and the vertical member 28 serving effectively to sustain the channeled portion of said top chord member in advance of the point or tip of the frog point 16.

The top and bottom chord members 12 and 13, together with the vertical members 14 and 28 may, as aforesaid, be cast in one piece, in which event an opening 29 may be provided in the bottom chord member 13 beneath the frog point 16, and the end of the frog body opposite the shank 19 may be open, as shown, to accommodate means for supporting the mold core. Alternatively, the top and the bottom chord members 12 and 13 may be cast or forged as separate units with the vertical members 14 and 28 formed as parts of either of said units or as parts of each of them. According to the embodiment of the invention illustrated in Figs. 1 to 4 the top and the bottom chord members are formed as separate units and the vertical members 14 and 28 are formed in part on each of said units. The separate units may remain separated or they may be welded together, as indicated at 30, at the point where the vertical members 14 and 28 are divided, openings 31 being provided in the portions of the members 14 which lie to either side of the member 28 for the insertion of electrode or other means employed for welding the vertical member 28.

Figs. 5 to 8 of the drawings illustrate a one-piece frog designated as A′, of box-girder form comprising a top chord member 12ᵃ, a bottom chord member 13ᵃ and only longitudinally extending vertical members 14ᵃ, to the exclusion of any transversely extending vertical members, connecting said top and bottom chord members. The top of the chord member 12ᵃ is channeled, as indicated at 15ᵃ to provide the tip portion of the frog point, designated as 16ᵃ, and wing rail elements, designated as 11ᵃ, one to either side of the frog point 16ᵃ and, as in the case of the insert type of frog body shown in Figs. 1 to 4, the vertical members 14ª extend generally parallel to each other longitudinally of the frog beneath the rail engaging portions 17ª of the top chord member 12ª and beneath the channeled portions of said top chord member to either side of the tip portion of the frog point 16ª so as effectively to sustain the wheel engaging and channeled portions of said top chord member. At the ends of the frog body are portions 32 against which the wing rails (not shown) are to be bolted with the tops and the gage sides of their heads disposed flush with the tops and the gage sides of the frog point 16ª and the wing rail elements 11ª, respectively. In the bottom chord member 13ª are openings 31ª which may accommodate means for supporting the core employed in casting the frog body A'.

Due to the absence of any transverse vertically extending members between the top and the botton chord members of both the insert type of frog body shown in Figs. 1 to 4 and the one-piece type of frog body shown in Figs. 5 to 8, the chord members 12ª and 13ª and the vertical members 14ª cool substantially uniformly with the result that there are avoided cracks and weaknesses such as might occur due to slower cooling of relatively large masses of metal at the junctions of transversely extending vertical members with the vertical members 14ª if transversely extending vertical members were employed in addition to the longitudinally extending vertical members 14ª.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

We claim:

1. A railway frog body of box-girder form comprising a top chord member, a bottom chord member, the top chord member having channels defining a frog point and wheel engaging portions one to either side thereof, and, with respect to said body, longitudinally extending vertical members between said chord members, a pair of said vertical members being disposed one adjacent to one side and the other adjacent to the other side of said body and each in part underlying a wheel engaging portion and in part underlying a channeled portion of said top chord member, and another of said vertical members being disposed approximately medially of said body and underlying the tip portion of the frog point and the channeled portion of said top chord member in advance of the tip portion of said frog point.

2. A railway frog body of box-girder form comprising a top chord member having channels in the top thereof defining a frog point and wheel engaging portions one to either side thereof, a bottom chord member, a pair of side vertical members between said chord members each in part underlying a part of the wheel engaging portion of the top member at the related side of the body and in part underlying the channeled portion of said top chord member, and another vertical member between said chord members extending longitudinally of said frog body medially thereof and in part underlying the tip portion of said frog point and in part underlying the channeled portion of said top chord member in advance of the tip portion of said frog point, said chord members being formed as separate units each carrying a part of each of said vertical members, and welds joining the parts of the respective vertical members together, the side vertical members having openings to accommodate an implement for welding the medial vertical member.

3. A frog body as set forth in claim 2 in which said body is formed at its sides to fit in the fishing spaces between the heads and the bases of wing rails to be fastened against the sides of said body.

4. A railway frog body of box-girder form comprising a top chord member, a bottom chord member, and, with respect to said body, longitudinally extending vertical members between said top and bottom chord members, the top chord member having channels defining a frog point and wheel engaging portions one to either side thereof, said longitudinally extending vertical members being disposed generally parallel to each other and in part underlying the wheel engaging portions and in part underlying the channeled portions of said top chord member, and at least one vertical member intermediate said longitudinally extending members underlying a channeled portion of said top chord member and attached only to said top and bottom chord members.

5. A railway frog body of box-girder form comprising a top chord member, a bottom chord member, and, with respect to the axis of the frog point, longitudinally extending vertical members connecting the top and bottom chords, the top chord member having channels defining a frog point and wheel bearing portions, one at either side thereof, said longitudinally extending vertical members having portions generally parallel to each other and including portions underlying the wheel bearing portions of the top chord member, and at least one vertical member intermediate said longitudinally extending members underlying the frog point of said top chord member and attached only to said top and bottom chord members.

6. A railway frog body of box-girder form comprising a top chord member, a bottom chord member, and, at each side of the axis of the frog point, vertical members connecting the top and bottom chords, the top chord member having channels defining a frog point and wheel bearing portions, one at either side thereof, said vertical members underlying said wheel bearing portions of the top chord member, and at least one additional vertical member underlying the frog point, said vertical members being attached to each other only through the top and bottom chords.

7. A railway frog body of box-girder form comprising a top chord member, a bottom chord member, and, at each side of the axis of the frog point, vertical members connecting the top and bottom chords, the top chord member having channels defining the frog point and wheel bearing portions, one at either side thereof, said vertical members at least in part underlying the wheel bearing portions of the top chord member, and at least one additional vertical member disposed intermediate the others and connecting the top and bottom chords, all said vertical members being of substantially uniform thickness throughout their length and being attached only to the top and bottom chord members.

8. A railway frog body of box-girder form comprising a top chord member, a bottom chord member, and, at each side of the body, vertical members connecting the top and bottom chords, the top chord member being channeled to define a frog point and wheel bearing portions, and at least one additional vertical member disposed intermediate the others and connecting the top and bottom chords, said vertical members being attached to each other only through the top and bottom chords.

9. A railway frog body of box-girder form comprising a top chord member, a bottom chord member, and, at each side of the body, vertical members connecting the top and bottom chords, the top chord member being channeled to define a frog point and wheel bearing portions, said vertical members being disposed generally parallel to each other, and at least one additional vertical member disposed intermediate the others and connecting the top and bottom chords adjacent the frog point, said vertical members being attached to each other only through the top and bottom chords.

CHARLES W. BREED.
GEORGE R. BURKHARDT.